Figure 1:
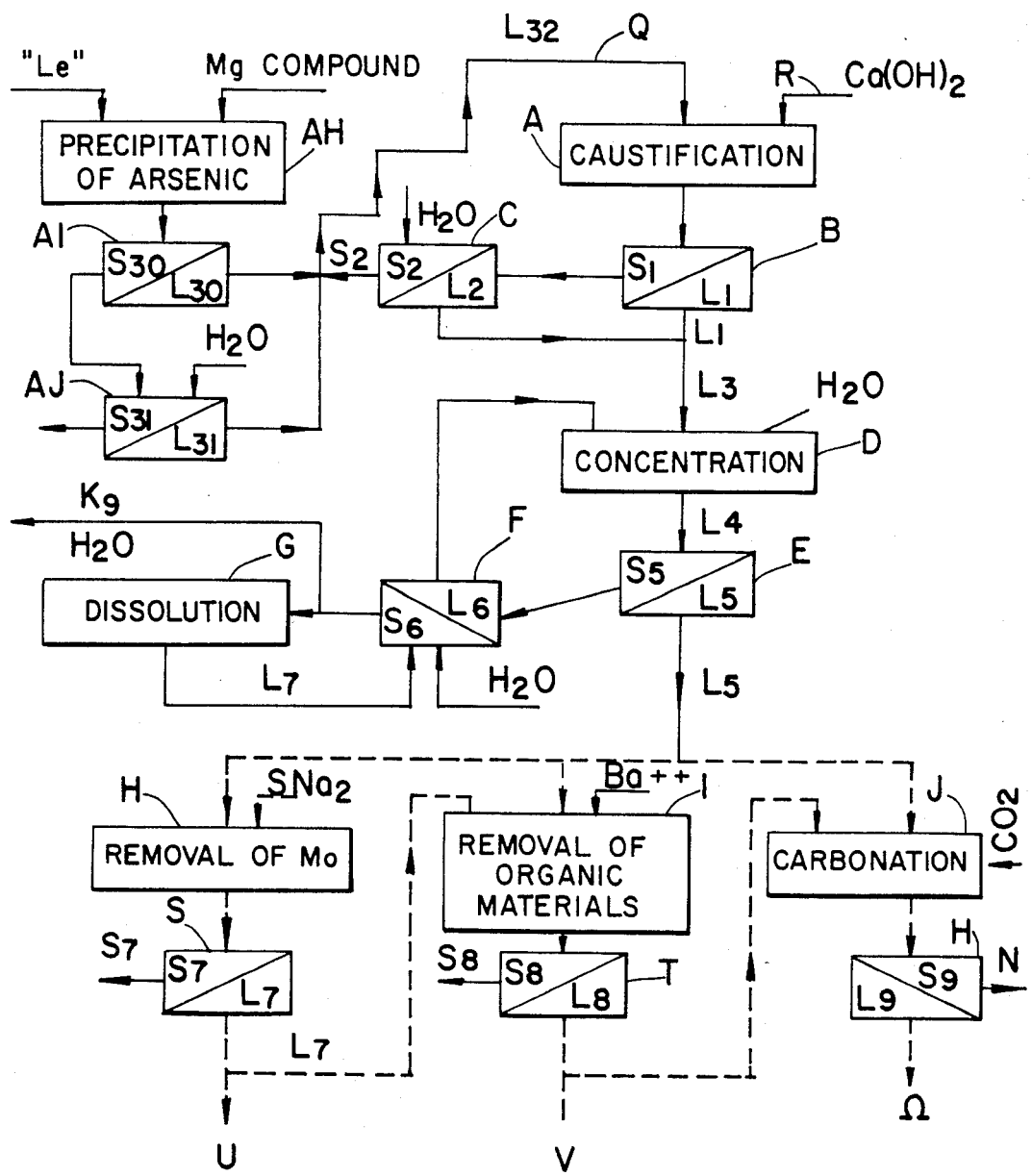

United States Patent [19]

Maurel

[11] Patent Number: 4,495,159
[45] Date of Patent: Jan. 22, 1985

[54] EXTRACTION OF ARSENIC IN SOLUTION IN LIQUORS CONTAINING ALKALI METAL CARBONATE, SULPHATE AND POSSIBLY HYDROXIDE, AND AT LEAST ONE OF THE METALS VANADIUM, URANIUM AND MOLYBDENUM

[75] Inventor: Pierre Maurel, Aix-en-Provence, France

[73] Assignee: Uranium Pechiney Ugine Kuhlmann, Paris, France

[21] Appl. No.: 398,832

[22] Filed: Jul. 16, 1982

[30] Foreign Application Priority Data

Jul. 29, 1981 [FR] France ............................. 81 15064

[51] Int. Cl.$^3$ ..................... C01B 27/00; C01B 29/00
[52] U.S. Cl. ........................................ 423/87; 423/55; 423/165
[58] Field of Search ............... 423/55, 87, 561 R, 617, 423/165

[56] References Cited

U.S. PATENT DOCUMENTS

| | | | |
|---|---|---|---|
| 1,243,323 | 10/1917 | Macklind et al. | 423/87 |
| 1,286,400 | 12/1918 | Pellegrin | 423/55 |
| 1,447,203 | 3/1923 | Ellis et al. | 423/87 |
| 1,504,627 | 8/1924 | Lamb | 423/87 |
| 1,554,371 | 9/1925 | Richardson | 423/617 |
| 2,339,888 | 1/1944 | Smith | 423/58 |
| 2,556,255 | 6/1951 | Carosella | 423/58 |
| 3,173,754 | 3/1965 | Kurtak | 423/57 |
| 3,939,245 | 2/1976 | Bellingham | 423/55 |
| 4,366,128 | 12/1982 | Weir et al. | 423/87 |

FOREIGN PATENT DOCUMENTS

| | | | |
|---|---|---|---|
| 1269600 | 6/1968 | Fed. Rep. of Germany | 423/87 |
| 2404601 | 4/1979 | France | 423/55 |
| 0424916 | 3/1935 | United Kingdom | 423/55 |
| 0814856 | 3/1981 | U.S.S.R. | 423/617 |

Primary Examiner—John Doll
Assistant Examiner—Wayne A. Langel
Attorney, Agent, or Firm—McDougall, Hersh & Scott

[57] ABSTRACT

A process for extracting arsenic from aqueous solution to be purified, in accordance with claim 1 of U.S. Pat. No. 2,404,601, which also contains alkali metal carbonate, sulphate, hydroxide or hydrogen carbonate, and which may also contain at least one of the metals vanadium, uranium and molybdenum, comprising caustification of said solutions by means of lime to convert the carbonates into alkali metal hydroxides, followed by separation of an alkali metal hydroxide-enriched liquor and a first precipitate essentially containing calcium carbonate which is subjected to a washing operation, concentration by evaporation of the mixture of the washing liquor of the first precipitate to produce a second precipitate which essentially comprises alkali metal sulphate, which is characterized in that, before the aqueous solution is caustified, the aqueous solution is treated by a magnesium compound in an amount at least equal to the stoichiometric amount required to cause precipitation of magnesium arsenate.

13 Claims, 2 Drawing Figures

EXTRACTION OF ARSENIC IN SOLUTION IN LIQUORS CONTAINING ALKALI METAL CARBONATE, SULPHATE AND POSSIBLY HYDROXIDE, AND AT LEAST ONE OF THE METALS VANADIUM, URANIUM AND MOLYBDENUM

The present invention which relates to a process for the purification of solutions containing an alkali metal carbonate, sulphate, hydroxide or hydrogen carbonate, and one at least of the metals vanadium, uranium and molybdenum, and inorganic and/or organic impurities, concerns selective purification in respect of arsenical materials contained therein.

In French Pat. No. 2 404 601, the present applicants described a process for purifying solutions containing sodium carbonate, sulphate, hydroxide and/or hydrogen carbonate, and one at least of the metals belonging to the group formed by vanadium, uranium and molybdenum, in the form of sodium salt.

Such solutions originated from a cycle involving attacking a uraniferous or vanadiferous ore, which may also contain molybdenum, after precipitation and separation of the metal which is to be produced as the useful product, in accordance with a known method.

Thus, in the case for example of a uraniferous ore, the ore being attacked by a sodium carbonate and/or bicarbonate liquor, the solubilised uranium which is present in the liquor after the attack operation is usually precipitated in the form of sodium uranate. The sodium uranate may be converted using known means, such as:

either into an ammonium uranate which is crystallised by a sulphur-ammonium transposition, which comprised treating the sodium uranate with a solution of ammonium sulphate, or by sulphuric redissolution and precipitation of the uranium peroxide, by the introduction of hydrogen peroxide.

Irrespective of the method involved in precipitation and separation of the uranium, such operations resulted in the production of solutions containing sodium carbonate, sodium sulphate, free sodium hydroxide or sodium hydrogen carbonate, which had to be purified before being recycled to the ore attack operation.

It is with that in mind that the present applicants described, in French Pat. No. 2 404 601, a process for the purification of the above-indicated solutions, which was characterised in that said solutions were treated at a temperature which is at most equal to boiling temperature, with an amount of lime of from 0.1 to 20 times the stoichiometric amount necessary for converting the carbonates and hydrogen carbonates present into sodium hydroxide, without taking account of the amount of lime necessary for precipitating the insoluble metal compounds of calcium, then that separation and washing of a first precipitate were effected, said first precipitate essentially containing calcium carbonate and a mixture of other organic and inorganic calcium salts and a sodium hydroxide-enriched liquor, that the mixture of said liquor and the washing liquor of the first precipitate was concentrated by evaporation until the sodium hydroxide content was at most equal to 50%, to cause the production of a second precipitate, that the crystals of said second precipitate were separated from their sodium hydroxide-rich mother liquor, and that said sodium hydroxide-rich liquor was recovered.

In that process, the second precipitate was generally and essentially formed by sodium sulphate which was extracted from the treatment cycle.

After it had been removed from the treatment cycle referred to above, the sodium sulphate could be put to use in industrial situations, or stored in a suitable location.

However, it may happen that such solutions which result from a uraniferous or vanadiferous ore attack cycle may also contain, as particularly troublesome impurities, arsenic which is solubilised in the form of alkali metal arsenate, the solubility of which increases in proportion to a decreasing amount of hydroxide in the medium.

As soon as the purification process described in French Pat. No. 2 404 601 was applied to the above-mentioned solutions, when also containing arsenic, the applicants found that it is difficult to remove the arsenic from such solutions solely by the process referred to above, and the results of attempting to remove the arsenic from such solutions in that way were uncertain. In fact, depending on the composition of the solution to be purified, if the amount of lime introduced is higher than the stoichiometric amount to precipitate carbonates, arsenates and other organic salts, the result produced by caustification of the solution is a first precipitate which is essentially formed by calcium carbonate and a mixture of organic and inorganic calcium salts, including arsenate.

However, if the amount of lime introduced is smaller and/or just sufficient to cause precipitation of calcium carbonate alone, the arsenic remains in solution in the liquor resulting from separation of the first precipitate. In addition, as soon as the operation of concentrating that liquor by evaporation is effected, the arsenic may precipitate in part in the form of sodium arsenate, at the same time as sodium sulphate. Finally, it may be that a fraction or the whole of the arsenic which is initially present may remain in solution in the liquor resulting from separation of the first precipitate and/or the second precipitate. Now, as the applicants have explained, the liquor collected after removal of the carbonate and sulphate is enriched in respect of free sodium hydroxide and may be used in a cycle comprising attacking an ore containing at least one of the metals vanadium, uranium and molybdenum, as well as many impurities, including arsenic. Hence, the arsenic content of such a liquor will increase when the ore is subjected to the attack operation. That impurity will become increasingly troublesome, since it will occur in increasing levels of concentration in the liquor impregnating the precipitate formed by the metal which is to constitute the useful product.

Thus, as the applicants found, applying the process described in Pat. No. 2 404 601 to the purification of solutions containing sodium carbonate, sulphate, hydroxide or hydrogen carbonate and arsenic, among other impurities, does not permit the arsenic in solution to be selectively extracted, and leaves the user faced with major disadvantages such as resulting in precipitates which contain, in mixture, in the first case, calcium carbonate and arsenate and, in the second case, sodium sulphate and sodium arsenate, or employing a recycled attack liquor which already has a high arsenic content and which may increase its arsenic content until it becomes extremely troublesome from the point of view of the state of purity of the metals involved such as sodium uranate, vanadate and molybdate.

For, in spite of its low level of solubility, calcium arsenate which occurs in the solid effluent formed by the first precipitate may cause environmental pollution, as already explained, and may require particular and expensive precautions to be taken for storage thereof, by virtue of its being mixed with the other salts removed. It therefore appears to be a desirable and attractive proposition for the arsenic to be selectively extracted in such a form as to permit the arsenic either to be put to use or else to be stored in an easy manner which does not give rise to environmental pollution, or converted into iron arsenate which is legally permitted to be stored without particular precautions, by virtue of being extremely insoluble.

It is for this reason that, continuing their research in this field, the applicants have now found that it was possible to extract the arsenic, using a novel process which overcomes the above-mentioned disadvantages.

The process according to the invention for extracting arsenic from an aqueous solution to be purified, which contains alkali metal carbonate, sulphate, hydroxide or hydrogen carbonate and which may also contain at least one of the metals vanadium, uranium and molybdenum, the process comprising caustification of said solutions by means of lime to convert the carbonates into alkali metal hydroxides, followed by separation of an alkali metal hydroxide-enriched liquor, and a first precipitate essentially containing calcium carbonate which is subjected to a washing operation, concentration by evaporation of the mixture of the washing liquor of the first precipitate, to produce a second precipitate essentially comprising alkali metal sulphate, is characterised in that, before the caustification operation is performed, the aqueous solution to be purified is treated with a magnesium compound in an amount that is at least equal to the stoichiometric amount required to cause precipitation of magnesium arsenate.

As already explained in French Pat. No. 2 404 601, the levels of concentration in respect of alkali metal sulphate, carbonate, hydroxide or hydrogen carbonate and alkali metal compounds of at least one of the elements of the group formed by uranium, molybdenum, vanadium and arsenic, are not critical.

Their relative proportions may vary within wide limits, without interfering with satisfactory performance of the process according to the invention.

The alkali metal compounds such as sulphate, carbonate, hydroxide or hydrogen carbonate, are sodium and potassium compounds.

Hereinafter in the description of the process according to the invention, reference will be made only to sodium compounds, it being appreciated that potassium compounds may be treated in the same manner.

In regard to its essential features, the novel process for removing the arsenic contained in the solutions to be purified, resulting from the treatment of vanadiferous, uraniferous or molybdeniferous ore, comprises the following stages, some of which have already been described in the main patent:

(a) the introduction of a magnesium compound into the solution to be treated, thereby causing precipitation of magnesium arsenate, (b) separation of the magnesium arsenate precipitate, impregnated with mother liquor and the alkaline liquor containing alkali metal carbonate, sulphate, hydroxide or hydrogen carbonate, which is intended to be subsequently caustified, (c) optionally, washing the magnesium arsenate precipitate with water or with a recycled liquor, (d) combining the liquor resulting from separation of the magnesium arsenate precipitate with the washing waters of said precipitate, that mixture forming the solution which is subjected to the caustification operation, (e) caustification of the solution using an amount of lime which is from 0.1 to 20 times the stoichiometric amount for converting the carbonate and bicarbonate present into alkali metal hydroxide, (f) separation of a first precipitate which is impregnated with mother liquors and which is formed by a mixture of organic and inorganic calcium salts, from an alkali metal hydroxide-enriched liquor containing an alkali metal sulphate, (g) washing the first precipitate, thereby providing for extraction of the impregnation liquor, giving washing waters which are combined with the above-mentioned alkaline liquor which is enriched in respect of alkali metal hydroxide, (h) concentration by evaporation of the liquor resulting from the mixing step, to produce a second precipitate which is essentially formed by alkali metal sulphate, (i) separation of the crystals of the second precipitate, impregnated with a alkali metal hydroxide-rich mother-liquor, (j) washing of the second precipitate, with recycling of the washing waters to the concentration step, and (k) recovery of the alkali metal hydroxide-rich liquor.

As already stated, and in accordance with the invention, the aqueous solution which contains alkali metal carbonate, sulphate, hydroxide or hydrogen carbonate and arsenate and which may also contain at least one of the metals vanadium, uranium and molybdenum is treated prior to any caustification step by means of a compound of magnesium, thereby permitting the arsenic to be precipitated in the form of magnesium arsenate.

The magnesium compound may be introduced into the medium to be treated in the form of an aqueous solution or in the form of a finely dispersed aqueous suspension or in powder state, while the magnesium compound may be selected from the group formed by compounds such as dolomite, magnesite, magnesium salts and magnesium hydroxide and oxide.

The temperature at which the aqueous solution is treated with the magnesium compound is lower than boiling temperature and is preferably from 50° C. to 97° C.

The amount of magnesium compound which is generally used for precipitation of the arsenic is close to the stoichiometric amount required for removing it in the form of magnesium arsenate.

When the amount of magnesium compound is greater than the stoichiometric amount, the excess magnesium is collected in the form of a magnesium hydroxide precipitate, at the same time as the magnesium arsenate precipitate.

The precipitate produced is separated from the liquor which is enriched in respect of alkali metal carbonate, sulphate, hydroxide or hydrogen carbonate, said liquor then being subjected to the caustification operation.

The magnesium arsenate precipitate may then be subjected to a washing operation which permits the impregnation mother liquor to be collected, the liquor collected after the washing step also being subjected to caustification.

As described in French Pat. No. 2 404 601, caustification of the solutions to be purified is effected by introducing an amount of lime which is least equal to the stoichiometric amount required for virtually total conversion of the sodium carbonate and hydrogen carbonate present in the liquor, into sodium hydroxide, in accordance with the following reactions:

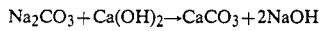

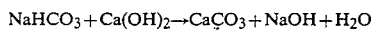

When the solutions to be caustified contain metal salts which with the lime and under the operating conditions are liable to form an insoluble compound, the total amount of lime introduced is formed by the amount of lime which is actually necessary for caustification of the carbonate and/or hydrogen carbonate in solution and the amount of lime necessary for precipitating said metal elements in the form of insoluble calcium compounds. Consequently, and in order to simplify understanding of the subject of the present invention, we shall mention only the amount of lime which is actually necessary for solely caustifying the sodium carbonate or hydrogen carbonate.

The corresponding temperature of the caustification treatment, at atmospheric pressure, is at most equal to the boiling temperature of the liquor treated. It is therefore between 20° C. and 100° C. but preferably from 50° C. to 97° C.; in most cases, precipitation and filtrability of the residue obtained are improved when the caustification temperature is close to the boiling temperature.

The precipitate essentially comprises calcium carbonate and the excess lime and, in a minor amount, organic and inorganic calcium salts.

Separation of the first precipitate from the mother liquor containing the sodium hydroxide is effected by known means such as for example filtration, centrifuging, settling, etc.

The liquor containing the sodium hydroxide is then subjected to concentration by evaporation until reaching a sodium hydroxide concentration of at most 50%, and such that the residual amount of sodium sulphate in the liquor after evaporation is adjusted to the desired value, as described in French Pat. No. 2 404 601.

A second precipitate is then collected, essentially comprising sodium sulphate, with which there may be associated sodium molybdate, being separated from the sodium hydroxide-rich mother liquor by known means, and then washed with water or with a sodium sulphate-saturated aqueous solution, the washing liquor being recycled to the concentration operation.

As the sodium hydroxide-rich mother liquor recovered still contains impurities, it may be desirable to carry out a treatment on said liquor for extracting therefrom the elements such as molybdenum which has not been precipitated at the same time as the sodium sulphate, organic materials and other substances, which are troublesome in regard to subsequent use thereof.

Likewise, the liquor may be subjected to a transformation treatment before being used in the production cycle.

In accordance with a first alternative procedure for removing the molybdenum, that metal may be precipitated in known manner for example in the form of a molybdenum sulphide by acidification of the sodium-bearing mother liquor and the addition of an alkali metal sulphide which is in excess relative to the stoichiometric amount required.

In a second alternative procedure for extracting the organic materials, the sodium-bearing mother liquor is treated in known manner, for example:

either with a barium compound, making use of the low level of solubility of barium organates in the sodium medium. The barium compound is introduced in an amount which is at least equal to the stoichiometric amount required to cause precipitation and removal by separation of the organates of that metal, or with sodium dioxide causing "in situ" degradation of the organic materials, or with hydrogen peroxide, causing the same degradation effect, or finally by passing said liquor over activated carbon having the known property of retaining the organic components which are present in the mother liquor being treated.

In a third alternative procedure, the sodium-bearing mother liquor may be partially or totally carbonated by bringing it into contact with carbon dioxide gas using known means, for example by blowing in a large excess of carbon dioxide gas.

Depending on the characteristics of the sodium-bearing mother liquor, upon being discharged from the evaporation operation, and the uses to which the purified liquor is to be put, it is possible to use one or other of the above-indicated procedures, or for such procedures to be partially or totally combined.

In accordance with an additional arrangement of the process according to the invention, it is possible that, in treatment of the solutions by means of lime, there may be incomplete caustification of the sodium carbonate, in spite of the fact that a large excess of lime is introduced, or else it may be found desirable to perform controlled caustification of the sodium carbonate, by introducing a sub-stoichiometric amount of lime. In that case, in the course of the operation of concentrating the alkali metal mother liquor by evaporation, there appears a precipitate which may be found either by the double salt $2Na_2SO_4 \cdot Na_2CO_3$, or a mixture of sodium carbonate and the double salt, or finally, a mixture of sodium sulphate and the double salt, the production of one or other of the three possible precipitates essentially depending on the composition of alkali the liquor after the caustification operation, and the evaporation rate employed.

In the case of incomplete caustification as referred to above, the free sodium hydroxide-rich mother liquor which is produced by liquid-solid separation after evaporation still contains impurities which should desirably be removed by an additional treatment, the most troublesome thereof being molybdenum and the organic materials which are removed by one or other of the alternative procedures referred to above.

Likewise, carbonation of the free sodium hydroxide-rich mother liquor may be effected as already described above.

FIG. 1 of the accompanying drawing is a diagrammatic view of the process according to the invention showing in solid lines the circuit used when it is desired to remove only magnesium arsenates, calcium carbonates and sodium sulphates and, in broken lines, the circuits used for subjecting the sodium hydroxide-rich mother liquor either to an additional operation for purification in respect of molybdenum and/or organic materials, or a carbonation operation, by performing the alternative procedure referred to above for that purpose, or by effecting a complete treatment by successive performance of the above-described alternative procedures.

The alkaline solutions Le to be treated, which also contain arsenic, are introduced at AH, together with the magnesium compound. The slurry which is produced in this way, by virtue of precipitation of the magnesium arsenate, is introduced into the container AI for effecting separation of a cake $S_{30}$ and a liquor $L_{30}$ which is intended to be caustified.

The cake $S_{30}$ is introduced into the region AJ for optionally performing a washing operation using water, for extracting the impregnation mother liquors. After separation of the washed cake $S_{31}$ and the liquor $L_{31}$ which carries the impregnation mother liquors, the latter liquor is combined with the liquor $L_{30}$, giving an alkaline liquor $L_{32}$ which is intended to be caustified.

The liquor $L_{32}$ is then introduced at A, together with the lime required for caustification thereof. The slurry produced after treatment by means of the lime is introduced into the region B for effecting separation of a cake $S_1$ and a liquor $L_1$ containing certain solubilised impurities. The mother liquors of the cake $S_1$ are extracted at C by means of an amount of water which is introduced. The mother liquors $L_2$ which are thus extracted are mixed with the liquor $L_1$, forming the liquor $L_3$. The resulting cake $S_2$ which is extracted from C is essentially formed by calcium carbonate.

The liquor $L_3$ formed by the mixture of liquors $L_1$ and $L_2$ is passed into D for effecting concentration in respect of free sodium hydroxide by evaporation of water, causing precipitation of the sodium sulphate.

The slurry $L_4$ issuing from the concentration step is introduced into E where separation of a liquor $L_5$ and a cake $S_5$ is effected.

The cake $S_5$ which essentially comprises sodium sulphate is entrained into F where it is subjected to a rinsing operation, either by means of water or by means of a sodium sulphate-saturated solution, with recycling of the rinsing liquor $L_6$ to D.

The cake $S_6$ which is impregnated with the rinsing liquor may be taken out of the treatment cycle by K or it may be partly introduced with water into G where the rinsing solution $L_7$ which is intended to be used in F is prepared.

The free sodium hydroxide-rich liquor $L_5$ issuing from E may contain in solution impurities such as for example molybdenum, and various organic and inorganic salts which it may be desirable to remove.

If the molybdenum is to be removed from the liquor $L_5$, the liquor is introduced into H with the required amount of $Na_2S$. The resulting slurry is introduced into S for separation of the solid phase formed by molybdenum sulphide, which is removed, and the phase $L_7$ which may be collected in U or else recycled to another stage of the process such as I or J.

If the organic materials present are to be removed from the liquor $L_5$, the liquor is introduced into I with for example a sufficient amount of a barium compound, causing precipitation of barium organates. The slurry issuing from I is then introduced into T for separation of a cake $S_8$ and a liquor $L_8$ which can be collected in V or else recycled to another stage of the process such as for example J.

Likewise, if it is desirable to carbonate the sodium hydroxide-rich liquor $L_5$, that liquor is introduced into J to undergo carbonation therein, by blowing in $CO_2$. The resulting slurry can be used in the form in which it is produced or it may be treated in M to separate the cake $S_9$ formed by sodium carbonate and/or bicarbonate and a carbonated liquor $L_9$ which may be collected in Ω or recycled to J.

However, it will be evident that the free sodium hydroxide-rich liquor $L_5$ may be successively subjected to two of the three treatments mentioned above, depending on the impurities which are to be removed and depending on the uses for which the liquor is intended after purification. For example, it is possible for the operations of removing molybdenum and the organic materials to be combined in series: in this case, an aliquot part of the whole of the liquor $L_7$ which results from the operation of removing molybdenum S is introduced into I and then T in order there to undergo an operation of removing organic materials. Conversely, the operation of removing organic materials may precede the operation of removing molybdenum. It is also possible successively to effect removal of the organic materials and carbonation of the liquor: in that case, an aliquot part or the whole of the liquor $L_8$ resulting from T in which the organic materials are removed, is introduced into J in order there to undergo the desired carbonation step.

The process according to the invention is noteworthy by virtue of its flexibility and adaptability. This is very important because, if sodium sulphate is generally present in the solutions to be purified, and if moreover sodium carbonate is also generally present, the other components present may vary qualitatively and quantitatively according to the origin of the solutions to be treated. Thus, the process is found to be particularly attractive from the environmental point of view, as it does not involve the dumping of liquid waste matter in the environment.

Moreover, this process enjoys other advantages, of which we may first mention the possibility of recycling a concentrated solution of free NaOH, or a solution of sodium carbonate, possibly a suspension of that salt, or even sodium carbonate and/or bicarbonate in the solid state, although there is also the possibility of being able to control as required the amount of sodium sulphate which is recycled, as well as the amounts of impurities (molybdenum, organic materials, vanadium . . . ).

The advantages of the process according to the invention will be much better appreciated from the following Example which is given by way of illustration.

Figure 2:
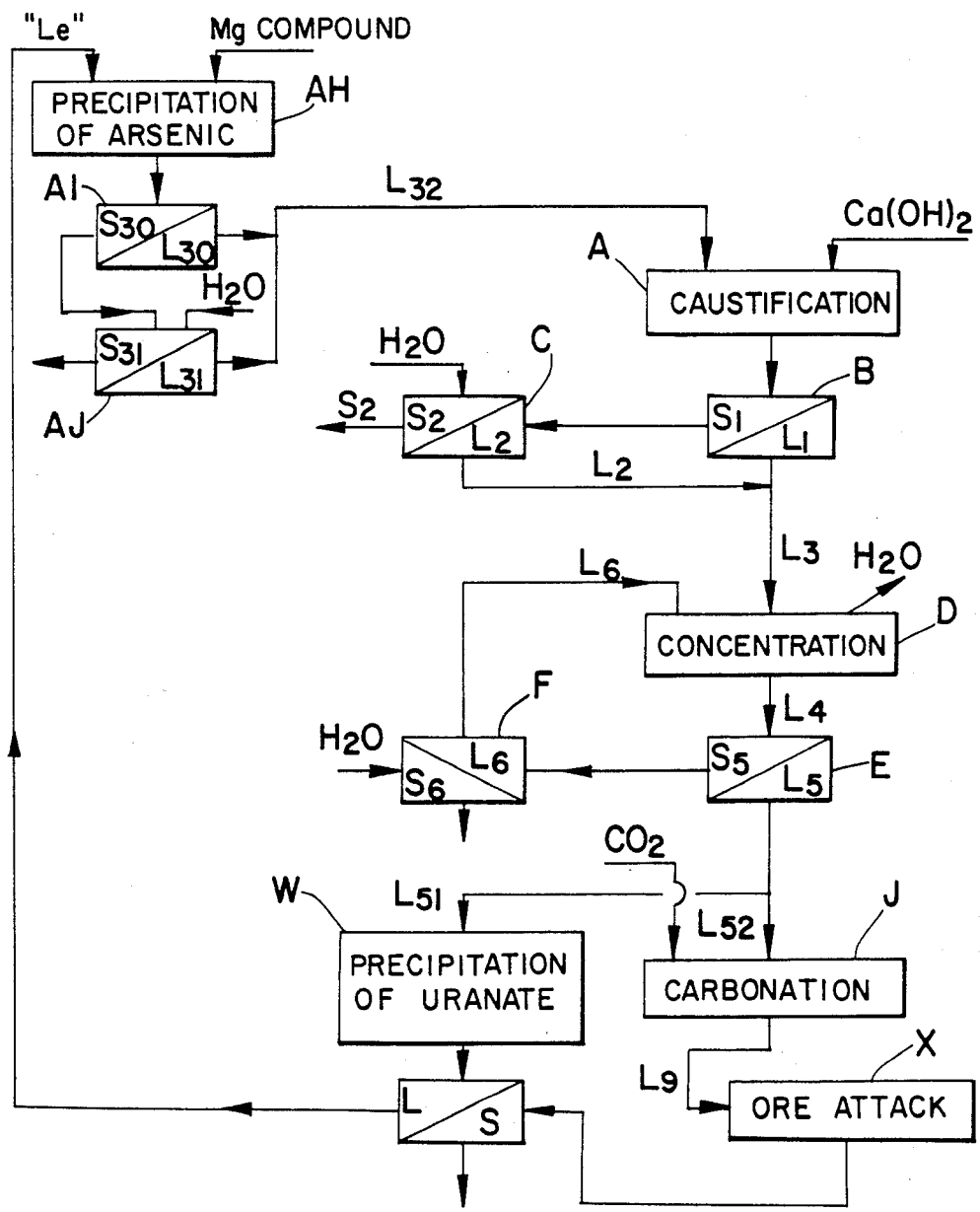

EXAMPLE (illustrated in FIG. 2)

A solution which was rich in residual sodium hydroxide and which was drawn off at the end of a uraniferous ore attack cycle, after precipitation and separation of sodium uranate, and which also contained arsenic, was treated by the process of the invention. The composition of the solution Le by weight was as follows:

| | |
|---|---|
| NaOH | 2.150 kg |
| $Na_2CO_3$ | 11.010 kg |
| $Na_2SO_4$ | 9.148 kg |
| Arsenic | 0.450 kg |
| Uranium | 0.007 kg |
| Molybdenum | 1.897 kg |
| $H_2O$ and various. | 275.338 kg |

300 kg of that solution was introduced at AH with 1.511 kg of $Mg.SO_4$, representing an excess, for the purpose of eliminating the arsenic present, by precipitation of magnesium arsenate.

The slurry issuing from AH was decanted into AI in which the operation of separating a cake $S_{30}$ and a liquor $L_{30}$ was effected.

The cake $S_{30}$ was then subjected to a rinsing operation in AJ using 10 kg of water, giving a cake $S_{31}$ and a washing liquor $L_{31}$.

The two liquors $L_{30}$ and $L_{31}$ were mixed, giving a liquor $L_{32}$ which was of the following composition:

| NaOH | 2.142 kg |
|---|---|
| $Na_2CO_3$ | 11.005 kg |
| $Na_2SO_4$ | 10.042 kg |
| Arsenic | 0.135 kg |
| Uranium | 0.007 kg |
| Molybdenum | 1.894 kg |
| $H_2O$ and various. | 284.324 kg |

309.551 kg of the above-indicated solution was introduced at A with 8.537 kg of lime, representing an excess, for effecting virtually total caustification of the carbonate present, by heating the solution to 95° C. and maintaining it at that temperature for a period of about 3 hours.

The resulting slurry was then decanted into B where the operation of separating the solid phase $S_1$ and the liquid phase $L_1$ was effected.

The cake $S_1$ was then rinsed in C with 25 kg of water. The mother liquors which impregnated the cake $S_1$ were thus extracted and combined with the liquor $L_1$ resulting from the separation operation B.

The cake $S_2$ which weighed 18.322 kg was of the following composition by weight:

| $CaCO_3$ | 9.448 kg |
|---|---|
| $Ca(OH)_2$ excess | 1.545 kg |
| Impregnation $H_2O$ and various | 7.329 kg |

The liquor $L_3$ formed by the mixture of liquors $L_1$ and $L_2$ represented a weight of 324.766 kg and was of the following composition, by weight:

| NaOH | 9.7 kg |
|---|---|
| $Na_2SO_4$ | 10.041 kg |
| Arsenic | 0.135 kg |
| Uranium | 0.007 kg |
| Molybdenum | 1.894 kg |
| Water and various | 301.996 kg |

It was passed into D where a concentration operation was carried out, by evaporation of 288.27 kg of water.

The slurry issuing from D was decanted into E where the operation of separating a cake $S_5$ and a liquor $L_5$ was effected.

The cake $S_5$ was then subjected to a rinsing operation in F, using 10 kg of water, giving a cake $S_6$. The washing liquor $L_6$ was recycled to D, in order to undergo concentration therein.

The cake $S_6$ represented a weight of 19.916 kg, and was of the following composition by weight:

| $Na_2SO_4$ | 11.729 kg |
|---|---|
| Arsenic | 0.016 kg |
| Impregnation $H_2O$ | 4.455 kg |

The liquor $L_5$ from the separation operation in E represented a weight of 28.53 kg and was of the following composition by weight:

| NaOH | 8.574 kg |
|---|---|
| $Na_2SO_4$ | 0.313 kg |
| Arsenic | 0.119 kg |
| Uranium | 0.007 kg |
| Molybdenum | 0.755 kg |
| $H_2O$ and various | 17.936 kg |

Upon discharge from E, the liquor $L_5$ was divided into two portions $L_{51}$ and $L_{52}$.

The liquor $L_{51}$, representing a weight of 16.961 kg, was directly recycled to W for precipitation of sodium uranate.

The liquor $L_{52}$, representing a weight of 11.619 kg, was introduced into J in order to undergo carbonation therein, by absorption of 4.151 kg of $CO_2$. The liquor $L_9$ resulting from the carbonation step in E was in actual fact a slurry having the following composition by weight:

| $NaHCO_3$ | 7.067 kg |
|---|---|
| $Na_2CO_3$ | 1.438 kg |
| $Na_2SO_4$ | 0.127 kg |
| Arsenic | 0.049 kg |
| Uranium | 0.003 kg |
| $H_2O$ and various | 7.475 kg |

The slurry indicated above was then recycled to X for the attack on the uraniferous ore.

I claim:

1. A process for extracting arsenic by means of a magnesium compound from aqueous solution to be purified, resulting from the alkaline attack on an ore, and extraction of the useful elements which are solubilized in the attack operation, which aqueous solution contains alkali metal carbonate, sulphate, hydroxide or hydrogen carbonate and may also contain at least one of the metals vanadium, uranium and molybdenum, said process comprising treating the solution with a magnesium compound at a temperature below the boiling point temperature for the solution to precipitate magnesium arsenate, removing the precipitated magnesium arsenate from the remaining liquor, adding lime to the liquor to convert carbonates into alkali metakl hydroxides to produce a first alkali metal hydroxide-enriched liquor and a first precipitate containing calcium carbonate, separating the first precipitate containing calcium carbonate, from the first alkali metal hydroxide-enriched liquor, and concentrating the combined liquor to produce a second precipitate containing alkali metal sulphate and a second alkali metal hydroxide-enriched liquor.

2. An arsenic extraction process as claimed in claim 1 in which the temperature at which the aqueous solution is treated with the magnesium compound is within the range of 50° C. to 97° C.

3. An arsenic extraction process as claimed in claim 1 in which, after the arsenic has been removed from the aqueous solution the aqueous solution is treated with an amount of lime which is from 0.1 to 20 times the stoichiometric amount for converting the carbonate and bicarbonate present into hydroxide.

4. An arsenic extraction process according to claim 1 characterised in that the liquor resulting from the caustification operation is subjected to concentration by evaporation until the level of concentration in respect of alkali metal hydroxide is at most 50% and until a precipitate essentially formed by alkali metal sulphate is produced.

5. An arsenic extraction process as claimed in claim 1, which includes the steps of separating the second precipitate from the second alkali metal hydroxide-enriched liquor, and adding an alkali metal sulphide to the separated second alkali metal hydroxide-enriched liquor to precipitate molybdenum sulphide, the amount of alkali metal sulphide added being in excess relative to the stoichiometric amount required to precipitate the molybdenum sulphide.

6. An arsenic extraction process as claimed in claim 1, which includes the steps of separating the second precipitate from the second alkali metal hydroxide-enriched liquor, and introducing a barium compound to the alkali metal separated second hydroxide enriched liquor in an amount at least equal to the stoichiometric amount for precipitation of barium organates.

7. An arsenic extraction process as claimed in claim 1, which includes the steps of separating the second precipitate from the second alkali metal hydroxide-enriched liquor, and treating the separated second alkali metal hydroxide-enriched liquor with sodium dioxide of hydrogen peroxide to cause "in situ" degradation of the organic material.

8. An arsenic extraction process as claimed in claim 1, which includes the steps of separating the second precipitate from the second alkali metal hydroxide-enriched liquor, and passing the separated second alkali metal hydroxide-enriched liquor into contact with activated carbon.

9. An arsenic extraction process as claimed in claim 1, which includes the steps of separating the second precipitate from the second alkali metal hydroxide-enriched liquor, and contacting the the separated second alkali metal hydroxide-enriched liquor with carbon dioxide for up to total carbonation of the liquor.

10. An arsenic extraction process as claimed in claim 1, which includes the step of washing the separated magnesium arsenate.

11. An arsenic extraction process as claimed in claim 10, which includes the step of combining the wash liquor from the step of washing the separated magnesium arsenate with the liquor separated from the magnesium arsenate precipitate.

12. An arsenic extraction process as claimed in claim 1, in which the magnesium compound is added in an amount of about the stoichiometric amount required for precipitation of arsenate compound to form magnesium arsenate.

13. The process of claim 1, wherein the first precipitate is washed to form a wash liquor, and said first wash liquor is combined with said first alkali metal hydroxide-enriched prior to concentrating said first liquor.

* * * * *